US010613886B2

(12) United States Patent
Farkas et al.

(10) Patent No.: US 10,613,886 B2
(45) Date of Patent: Apr. 7, 2020

(54) PROTECTING VIRTUAL COMPUTING INSTANCES

(71) Applicant: VMware, Inc., Palo Alto, CA (US)

(72) Inventors: Keith Farkas, Palo Alto, CA (US); Manoj Krishnan, Palo Alto, CA (US); Stoimen Gerenski, Sofia (BG); Ivaylo Petkov Strandzhev, Sofia (BG)

(73) Assignee: VMWARE, INC., Palo Alto, CA (US)

( * ) Notice: Subject to any disclaimer, the term of this patent is extended or adjusted under 35 U.S.C. 154(b) by 76 days.

(21) Appl. No.: 14/755,458

(22) Filed: Jun. 30, 2015

(65) Prior Publication Data

US 2017/0003992 A1 Jan. 5, 2017

(51) Int. Cl.
*G06F 9/455* (2018.01)
*H04L 29/08* (2006.01)

(52) U.S. Cl.
CPC ...... *G06F 9/45558* (2013.01); *H04L 67/1034* (2013.01); *H04L 67/1097* (2013.01); *G06F 2009/45591* (2013.01)

(58) Field of Classification Search
CPC ............. G06F 2009/45591; H04L 67/1097
See application file for complete search history.

(56) References Cited

U.S. PATENT DOCUMENTS

| | | | |
|---|---|---|---|
| 8,117,495 B2 | 2/2012 | Graham et al. | |
| 8,352,608 B1 * | 1/2013 | Keagy | G06F 8/63 709/220 |
| 8,539,484 B1 * | 9/2013 | Offer | G06F 9/45558 718/1 |
| 8,886,867 B1 * | 11/2014 | Bolt | G06F 12/10 711/6 |
| 2004/0205377 A1 * | 10/2004 | Nakamura | G06F 11/1494 714/4.5 |
| 2006/0085785 A1 * | 4/2006 | Garrett | G06F 9/5061 718/1 |
| 2008/0091891 A1 * | 4/2008 | Shiota | G06F 12/145 711/154 |
| 2008/0310421 A1 * | 12/2008 | Teisberg | H04L 12/4641 370/395.53 |
| 2009/0164770 A1 * | 6/2009 | Zimmer | G06F 21/51 713/2 |

(Continued)

*Primary Examiner* — Brian W Wathen
*Assistant Examiner* — Carina Yun
(74) *Attorney, Agent, or Firm* — Hanley, Flight & Zimmerman, LLC

(57) ABSTRACT

The present disclosure is related to systems and methods for protecting virtual computing instances. An example system can include a first virtual computing instance (VCI) deployed on a hypervisor and provisioned with a pool of physical computing resources. The hypervisor and the first VCI can operate according to a first configuration profile. The system can include a fault domain manager (FDM) running on a second VCI that is deployed on the hypervisor and provisioned by the pool of physical computing resources. The FDM can be configured to provide high availability support for the first VCI, and the FDM can operate according to a second configuration profile. The system can further include a hypervisor manager running on the second VCI. The hypervisor manager can be configured to facilitate interaction between the FDM and the hypervisor by translating between the first configuration profile and the second configuration profile.

19 Claims, 5 Drawing Sheets

(56) References Cited

U.S. PATENT DOCUMENTS

| | | | |
|---|---|---|---|
| 2010/0027552 A1* | 2/2010 | Hill | H04L 12/66 |
| | | | 370/401 |
| 2010/0070970 A1* | 3/2010 | Hu | G06F 9/45533 |
| | | | 718/1 |
| 2011/0055396 A1* | 3/2011 | Dehaan | H04L 41/0803 |
| | | | 709/226 |
| 2011/0099428 A1* | 4/2011 | Stenberg | H04Q 3/0075 |
| | | | 714/37 |
| 2011/0194563 A1* | 8/2011 | Shen | H04L 67/1002 |
| | | | 370/395.52 |
| 2012/0047501 A1* | 2/2012 | Box | G06F 9/45533 |
| | | | 718/1 |
| 2012/0054744 A1* | 3/2012 | Singh | G06F 21/53 |
| | | | 718/1 |
| 2012/0110055 A1* | 5/2012 | Van Biljon | G06Q 30/04 |
| | | | 709/201 |
| 2012/0254567 A1* | 10/2012 | Umbehocker | G06F 3/0604 |
| | | | 711/162 |
| 2013/0067465 A1* | 3/2013 | Fuhrman | G06F 9/5077 |
| | | | 718/1 |
| 2013/0185716 A1 | 7/2013 | Yin et al. | |
| 2013/0219030 A1* | 8/2013 | Szabo | H04L 49/70 |
| | | | 709/221 |
| 2013/0263209 A1* | 10/2013 | Panuganty | H04L 43/04 |
| | | | 726/1 |
| 2014/0101361 A1* | 4/2014 | Gschwind | G06F 12/0292 |
| | | | 711/6 |

* cited by examiner

PROTECTING VIRTUAL COMPUTING INSTANCES

BACKGROUND

Virtual computing instances (VCIs), such as virtual machines, virtual workloads, data compute nodes, clusters, and containers, among others, have been introduced to lower data center capital investment in facilities and operational expenses and reduce energy consumption. A VCI is a software implementation of a computer that executes application software analogously to a physical computer. VCIs have the advantage of not being bound to physical resources, which allows VCIs to be moved around and scaled to meet changing demands of an enterprise without affecting the use of the enterprise's applications. VCIs can be deployed on a hypervisor provisioned with a pool of computing resources (e.g., processing resources, memory resources, etc.). There are currently a number of different configuration profiles for hypervisors on which VCIs may be deployed.

DETAILED DESCRIPTION

Figure 1:
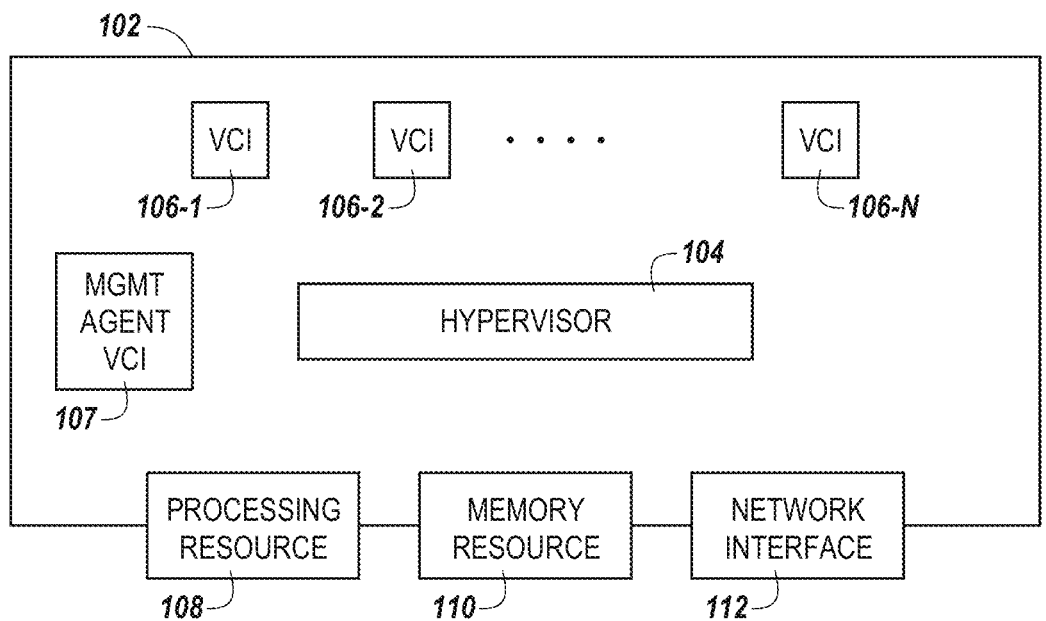
FIG. 1 is a diagram of a host for protecting VCIs according to a number of embodiments of the present disclosure.

The term "virtual computing instance" (VCI) covers a range of computing functionality. VCIs may include non-virtualized physical hosts, virtual machines (VMs), and/or containers. Containers can run on a host operating system without a hypervisor or separate operating system, such as a container that runs within Linux. A container can be provided by a virtual machine that includes a container virtualization layer (e.g., Docker). A VM refers generally to an isolated user space instance, which can be executed within a virtualized environment. Other technologies aside from hardware virtualization can provide isolated user space instances, also referred to as VCIs. The term "VCI" covers these examples and combinations of different types of VCIs, among others.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. The host operating system can use name spaces to isolate the containers from each other and therefore can provide operating-system level segregation of the different groups of applications that operate within different containers. This segregation is akin to the VM segregation that may be offered in hypervisor-virtualized environments that virtualize system hardware, and thus can be viewed as a form of virtualization that isolates different groups of applications that operate in different containers. Such containers may be more lightweight than VMs.

As software defined data centers become increasingly popular and widespread, an increasing number of consumers deploy VCIs on third-party hypervisors. As used herein, a "third-party hypervisor" includes components (e.g., hypervisors and/or VCIs) provided by a different party that a party that provides a cluster controller and/or high availability support. In some examples, a third-party hypervisor can use a configuration profile that is different than a configuration profile used by the party that provides the cluster controller and/or high availability support. Although a container provided by a container virtualization layer of a VM may not have the same configuration profile as the hypervisor on which the VM is deployed, this does not necessarily mean that the hypervisor is "third-party" with respect to the VM itself because the VM and the hypervisor may operate using the same configuration profile.

Deploying a VCI on a third-party hypervisor can create challenges in providing support due to a number of factors. One such factor is that, due to different configuration profiles (e.g., semantics) employed by different hypervisors, providing support and functionality for VCIs can be complicated or impossible with current techniques. For example, cross-platform communication in a heterogeneous hypervisor environment (e.g., an environment consisting of both first-party hypervisors and third-party hypervisors) may be complicated because different hypervisors can provide different semantics, which may not support functionalities across disparate platforms. This challenge can be further compounded when providing high availability in a heterogeneous hypervisor environment due to difficulties in translating between the different semantics provided by various hypervisors. However, protecting VCIs, for example by providing high availability, that are deployed on third-party hypervisors can help alleviate downtime, failover, and data loss. This is relevant to both service providers and customers, for example, for customers who consume virtual computing services. Advantageously, embodiments described herein can allow VCIs that are deployed on third-party hypervisors to be protected by providing high availability. For example, a management agent can be provided to translate a communication between a cluster controller and a third-party hypervisor to provide high availability to a VCI deployed on a third-party hypervisor.

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

The figures herein follow a numbering convention in which the first digit or digits correspond to the drawing figure number and the remaining digits identify an element or component in the drawing. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example a plurality of reference elements 106-1, 106-2, . . . , 106-N may be referred to generally as 106. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a diagram of a host and a system for protecting VCIs according to a number of embodiments of the present disclosure. The system can include a host 102 with processing resources 108 (e.g., a number of processors), memory resources 110, and/or a network interface 112. The host 102 can be included in a software defined data center. A software defined data center can extend virtualization concepts such as abstraction, pooling, and automation to data center resources and services to provide information technology as a service (ITaaS). In a software defined data center, infrastructure, such as networking, processing, and security, can be virtualized and delivered as a service. A software defined data center can include software defined networking and/or software defined storage. In some embodiments, components of a software defined data center can be provisioned, operated, and/or managed through an application programming interface (API).

The host 102 can incorporate a hypervisor 104 that can execute a number of VCIs 106-1, 106-2, . . . , 106-N (referred to generally herein as "VCIs 106"), and/or management ("MGMT") agent VCI 107. In some embodiments, as further described herein, management agent VCI 107 can be configured to facilitate high availability support for one or more of the VCIs 106. The VCIs can be provisioned with processing resources 108 and/or memory resources 110 and can communicate via the network interface 112. The processing resources 108 and the memory resources 110 provisioned to the VCIs can be local and/or remote to the host 102. For example, in a software defined data center, the VCIs 106 can be provisioned with resources that are generally available to the software defined data center and not tied to any particular hardware device. By way of example, the memory resources 110 can include volatile and/or non-volatile memory available to the VCIs 106. The VCIs 106 can be moved to different hosts (not specifically illustrated), such that a different hypervisor manages the VCIs 106.

Figure 2:
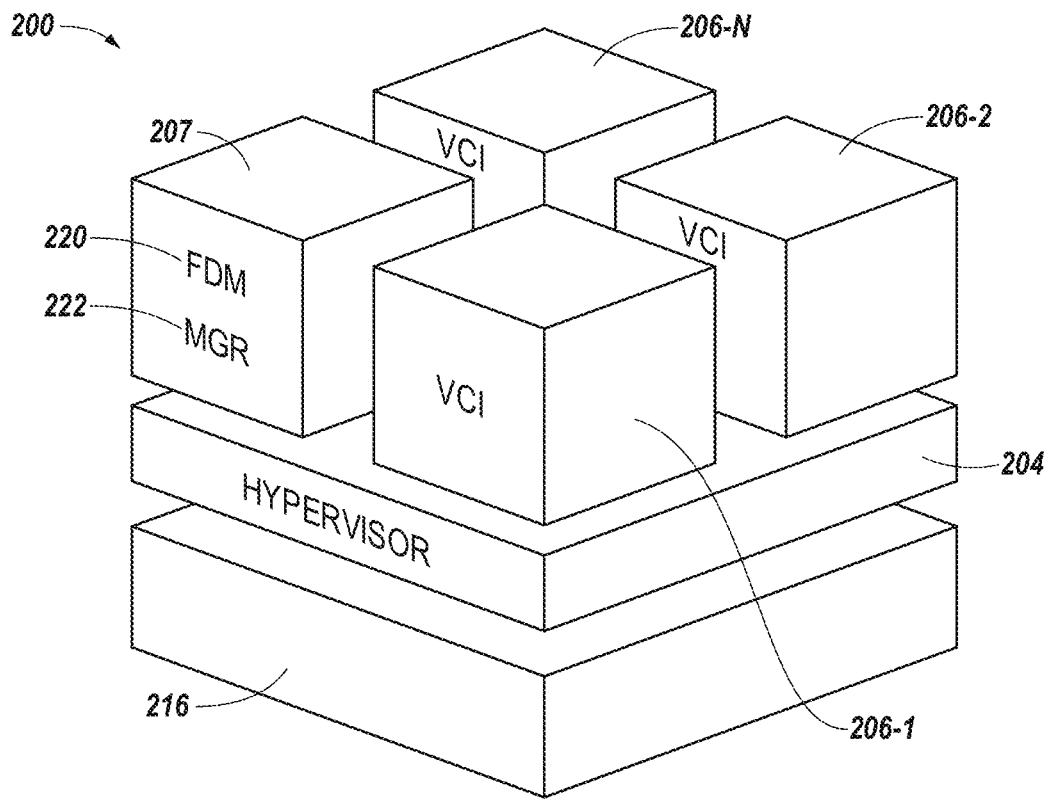
FIG. 2 is a diagram of a simplified system for protecting VCIs according to a number of embodiments of the present disclosure.

FIG. 2 is a diagram of a simplified system for protecting VCIs according to a number of embodiments of the present disclosure. The system 200 can include a pool of computing resources 216, a plurality of VCIs 206-1, 206-2, . . . , 206-N including a management agent VCI 207, and/or a hypervisor 204. As used herein, "agent VCI" is a VCI configured to run at least one piece of software that is configured to perform actions without additional outside instruction. The management agent VCI 207 is sometimes referred to herein as a VCI 207 (without the "management agent" moniker). The system 200 can include additional or fewer components than illustrated to perform the various functions described herein. The VCIs 206-1, 206-2, . . . , 206-N, and/or management agent VCI 207 can be deployed on the hypervisor 204 and can be provisioned with the pool of computing resources 216. The pool of computing resources 216 can include physical computing resources used in a software defined data center, for example, compute, storage, and network physical resources such as processors, memory, and network appliances. The VCIs 206-1, 206-2, . . . , 206-N, 207 can be provisioned with computing resources to enable functionality of the VCIs 206-1, 206-2, . . . , 206-N, 207. In some embodiments, the system 200 can include a combination of hardware and program instructions that are configured to provision the VCIs 206-1, 206-2, . . . , 206-N, 207 using a pool of computing resources in a software defined data center.

In some embodiments, the system 200 can include a first VCI 206-1 deployed on a hypervisor 204 and provisioned with a pool of physical computing resources 216. The hypervisor 204 and the first VCI 206-1 can operate according to a first configuration profile. As used herein, a "configuration profile" is a specific set of semantics that manages the functionality of an associated hypervisor, cluster controller, hypervisor manager, etc., as discussed in more detail in connection with FIG. 4, herein. As an example, a configuration profile can include a set of semantics and/or configuration information configured to facilitate communication between a hypervisor and a VCI deployed on the hypervisor.

A fault domain manager (FDM) 220 can run on a second VCI 207 that is deployed on the hypervisor 204 and provisioned by the pool of physical computing resources 216. Running the FDM 220 on a VCI 206-1, 206-2, . . . , 206-N, 207 can include executing program instructions on the pool of physical computing resources 216 that provision the hypervisor 204 on which the VCI 206-1, 206-2, . . . , 206-N, 207 is deployed. The FDM 220 can be configured to provide high availability support for the first VCI 206-1. In some embodiments, the FDM 220 can operate according to a second configuration profile. That is, FDM 220 can operate according to a configuration profile that is different from the configuration profile according to which the first VCI 206-1 operates. As discussed above, different configuration profiles can be employed by different suppliers of hypervisors, for example. In some instances a particular configuration profile may exist and/or be used for historical reasons, however in some instances a particular configuration profile may exist and/or be used to allow functionality across a series of components or products employed by a particular supplier.

A hypervisor manager "MGR" 222 can run on the second VCI 207. In some embodiments, the hypervisor manager 222 can be configured to facilitate interaction between the FDM 220 and the hypervisor 204 by translating between the first configuration profile and the second configuration profile. In this regard, the hypervisor manager 222 can translate management calls, for example, management calls from a cluster controller (e.g., cluster controller 324 illustrated in FIG. 3) for the hypervisor 204 and can translate a response to such calls. Embodiments are not limited to the hypervisor manager 222 translating management calls for a single hypervisor 204, however, and, as discussed in more detail in connection with FIG. 3 herein, the hypervisor manager (e.g., 307-1 illustrated in FIG. 3) can translate management calls for a plurality of hypervisors (e.g., third-party hypervisors 304 illustrated in FIG. 3).

In some embodiments, a VCI 207 can contain a hypervisor manager 222. The hypervisor manager 222 can facilitate management of a third-party hypervisor (e.g., third-party hypervisor 304 illustrated in FIG. 3) via a cluster controller and/or FDM 220, as described in more detail in connection with FIG. 3.

In some embodiments, the FDM 220 can be configured to provide high availability support for the hypervisor 204 and/or the VCIs 206-1, 206-2, . . . , 206-N. For example, the FDM 220 can be configured to provide high availability support for the first VCI 206-1 and/or the hypervisor 204 by monitoring the health of the hypervisor 204 and/or the first VCI 206-1. The FDM 220 can communicate the health of the hypervisor 204 and/or of the first VCI 206-1 to a cluster controller (e.g., cluster controller 324 illustrated in FIG. 3). In some embodiments, the FDM 220 can respond to health conditions that affect or impact one or more of the VCIs 206. For example, the FDM 220 can detect that one or more VCIs has lost access to a storage location (e.g., storage location 326 illustrated in FIG. 3) and can restart the one or more VCIs that have lost access to the storage location in response to the detection. In some embodiments, the FDM 220 can restart the one or more VCIs that have lost access to the storage location on a different hypervisor, as described in more detail herein. Embodiments are not limited to providing high availability support for only the first VCI 206-1, however, and the FDM 220 can be configured to provide high availability support for any or all of the VCIs 206, 207.

In some embodiments, the FDM 220 can be configured to write metadata regarding the health of the first VCI 206-1 to a storage location (e.g., storage location 326 illustrated in FIG. 3) of the first VCI 206-1. Metadata can include data that describes other data. For example, metadata regarding health can include data that describes heartbeat data. As used herein, a "heartbeat" is a signal that can be generated at regular intervals to indicate that a component such as a VCI 206 and/or a hypervisor 204 is operating. Heartbeat data can include virtual machine file system (VMFS) heartbeat data, however, embodiments are not so limited and the heartbeat data can include other types of heartbeat, or similar, data. As discussed further in connection with FIG. 3, the storage location can include a location of a datastore, for example, volatile and/or non-volatile memory that can store and provide access to files used by the VCIs 206-1, 206-2, . . . , 206-N, 207.

In some embodiments, high availability can be provided to VCI(s) 206-1, 206-2, . . . , 206-N and/or hypervisor(s) 204 with a cluster controller (e.g., cluster controller 324 illustrated in FIG. 3) service. For example, the cluster controller service can configure FDM 220 to protect VCI 206, for example to provide high availability support to the VCI 206 High availability can protect against VCI and/or hypervisor failures, network isolation of a hypervisor and its VCIs, loss of access to VCI storage locations by hypervisors, and/or operating system and/or application failures.

In some embodiments, high availability protection can be provided by the FDM 220. An instance of the FDM 220 can run on each hypervisor (e.g., hypervisors 304-1, 304-2, . . . , 304-N illustrated in FIG. 3) in a high availability enabled cluster. In some embodiments, the FDM 220 can run on a management agent VCI 207 deployed on a hypervisor 204 and provisioned by a pool of physical computing resources 216. Embodiments are not so limited; however, and the FDM 220 can run along side and/or be integrated with a management VCI 207 deployed on a hypervisor 204 and provisioned by a pool of physical computing resources 216.

When a hypervisor 204 fails, the FDM 220 master can attempt to restart VCIs 206 that are protected by high availability. In some embodiments, a VCI 206 can be protected by high availability in response to the cluster controller (e.g., cluster controller 324 illustrated in FIG. 3) determining that the power state of the VCI 206 changes. For example, a VCI 206 can be protected by high availability in response to the cluster controller (e.g., cluster controller 324 illustrated in FIG. 3) determining that the power state of a VCI 206 transitions from off to on. In some embodiments, the FDM 220 master, discussed in more detail in connection with FIG. 3, can record that a VCI is protected by high availability by adding a VCI's path (e.g., the VCI's local path) to a file in a storage location related to the VCI 206. In some embodiments, the file can be maintained in the root of the storage location. This file can also be read by the FDM 220 master to discover VCIs 206 that can be restarted after a failure.

In some embodiments, the FDM 220 master can record an identifier for each VCI 206 that is protected by high availability. This identifier can include information to associate a VCI 206 to the hypervisor 304 on which the VCI 206 is deployed, for example. In some embodiments, MGR 222 can perform actions requested by the FDM 220 master, e.g., powering on a VCI 206.

The FDM(s) 220 can receive various information as part of protecting VCIs 206 and/or as part of restarting VCIs 206 after a failure. In some embodiments, the FDM(s) 220 can receive information from one or more agents running on a hypervisor 204. The information can include the set of VCIs 206 registered on a given hypervisor 204, the power states of the VCIs 206 in the set of VCIs 206, information regarding storage locations mounted to the hypervisor 204, and/or accessibility of storage and/or networking of the VCIs 206. In some embodiments, each FDM 220 slave can forward information received from the one or more agents to the FDM 220 master so that the FDM 220 master can track the health of the VCIs 206, and restart VCIs 206 that fail.

Figure 3:
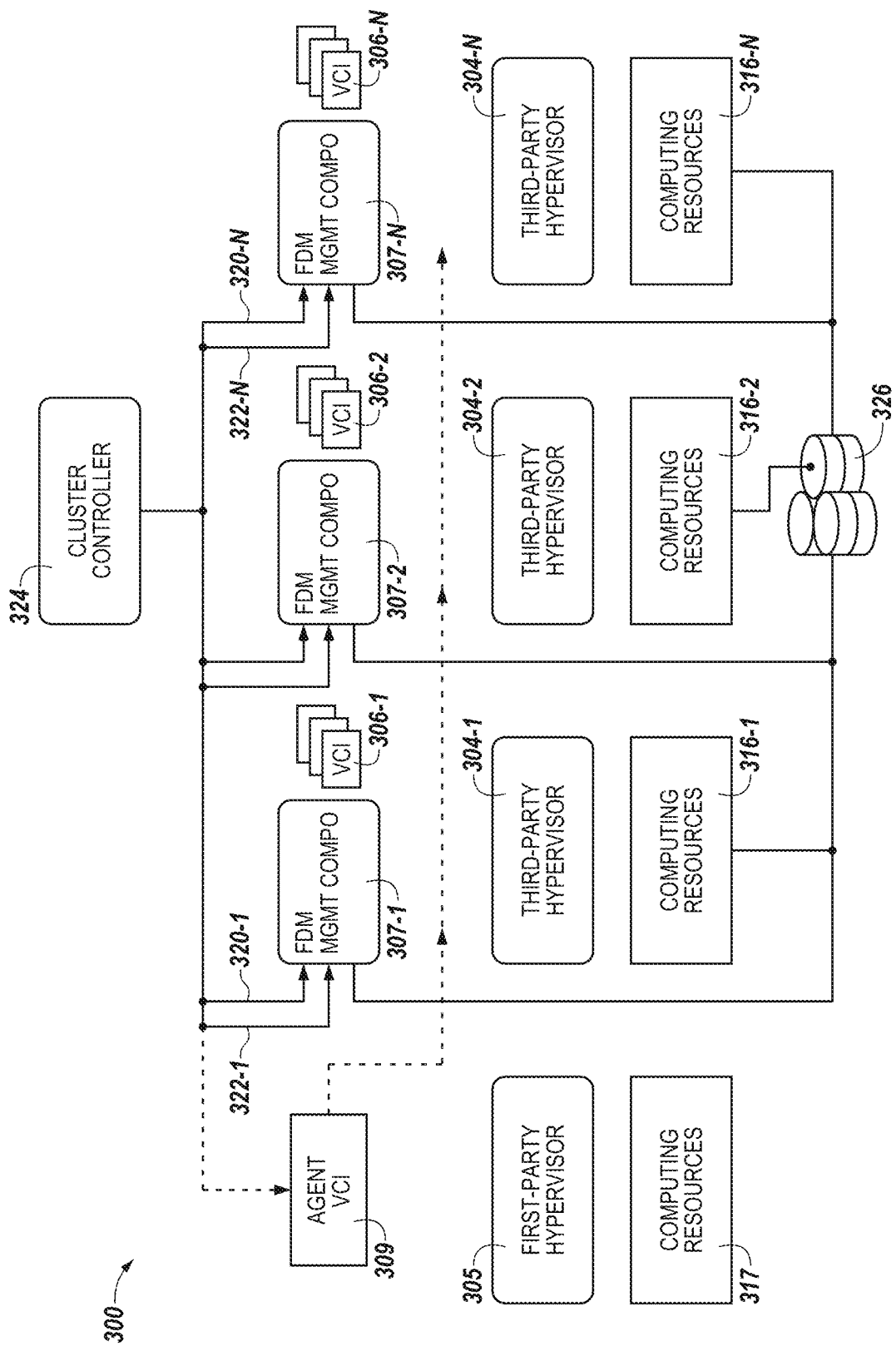
FIG. 3 is a diagram of a system for protecting VCIs according to a number of embodiments of the present disclosure.

Advantageously, in some embodiments, the FDM(s) 220 can use configuration information provided by the cluster controller (e.g., cluster controller 324 illustrated in FIG. 3) and/or heartbeat data that can be read from a storage location (e.g., storage location 326 illustrated in FIG. 3). In some embodiments, the cluster controller (e.g., cluster controller 324 illustrated in FIG. 3) can provide the FDM(s) 220 with cluster configuration information, hypervisor 204 to VCI 206 compatibility information, and/or a set of VCIs 206 to be protected. In some embodiments, network file system (NFS), common internet file system (CIFS), and/or VMFS heartbeats can be used to detect hypervisor 204 failures if high availability has been configured to use a heartbeat storage location for heartbeating. Accordingly, native heartbeats and/or heartbeats implemented by FDM 220 using standard file system primitives can be used to detect hypervisor 204 failures.

FIG. 3 is a diagram of a system for protecting VCIs according to a number of embodiments of the present disclosure. In some embodiments, the system 300 of FIG. 3 can be a virtual computing cluster. The system 300 can include a plurality of third-party hypervisors 304 and a respective plurality of VCIs 306 deployed on each of the respective plurality of third-party hypervisors 304. As shown in FIG. 3, each of the respective plurality of VCIs 306 can include more than one VCI deployed on each of the respective plurality of third-party hypervisors 304. For example, VCI 306-1 can include a plurality of VCIs deployed on third-party hypervisor 304-1, as indicated by the additional boxes shown behind each of the illustrated VCIs 306.

A respective management agent VCI 307-1, 307-2, . . . , 307-N can be deployed on each of the plurality of third-party hypervisors 304. In some embodiments, each of the respective management agent VCIs 307 can include a respective FDM 320-1, 320-2, . . . , 320-N and/or a respective hypervisor management component "MGMT COMPO" 322-1, 322-2, . . . , 322-N. In some embodiments, a deployment application may be provided to orchestrate and/or automate deployment, configuration, and/or setup of the respective management agent VCIs 307 and/or FDMs 320.

The system 300 can be configured to determine if any of the plurality of third-party hypervisors 304 provide an autostart function. In response to determining that at least one of the plurality of third-party hypervisors 304 provides an autostart function, the system 300 can be configured to enable an autostart function of the VCIs 306. In this regard, the respective VCIs 306 can be automatically restarted in response to a change in the power state of the hypervisor 304 on which the respective VCI 306 is deployed. In some embodiments, the respective management agent VCIs 307 can be configured to autostart (e.g., automatically restart) in response to a reboot of the third-party hypervisor 304.

The system 300 can include a cluster controller 324 that can be in communication with the third-party hypervisors 304 via the respective management agent VCIs 307. In some embodiments, the cluster controller 324 can be configured to provide high availability support for the plurality of third-party hypervisors 304 via the respective management agent VCIs 307.

In some embodiments, the respective FDMs 320 can be configured to implement high availability instructions from the cluster controller 324 for the corresponding third-party hypervisor 304. For example, FDM 320-1 can be configured to implement high availability instructions from the cluster controller 324 for third-party hypervisor 304-1. Similarly, FDM 320-N can be configured to implement high availability instructions from the cluster controller 324 for third-party hypervisor 304-N.

In some embodiments, when high availability is enabled on a cluster, the cluster controller 324 can install the FDM 320 on each hypervisor 304-1, 304-2, . . . , 304-N, 305 in the cluster. After the FDMs 320-1, 320-2, . . . , 320-N are installed and configured on respective hypervisors 304-1, 304-2, . . . , 304-N, 305, the FDMs 320 can elect a master. In some embodiments, the master can monitor the health of the other hypervisors 304-1, 304-2, . . . , 304-N, 305 and/or monitor the health of the other FDMs 320, orchestrate restarting any VCIs 306, 307 that fail, and/or report the status of the cluster to the cluster controller 324. As an example, FDMs 320-N can elect FDM 320-1 to be the master. In this example, FDM 320-1 would be responsible for monitoring the health of hypervisors 304-1, 304-2, . . . , 304-N, 305 as well as VCIs 306.

In some embodiments, the respective hypervisor management components 322 can be configured to translate a communication from the cluster controller 324 from a configuration profile of the cluster controller 324 to a configuration profile of the third-party hypervisor 304 on which the management agent VCI 307 is deployed. For example, hypervisor management component 322-1 can be configured to translate a communication from the cluster controller 324 to power on a VCI (e.g., VCIs 306, 307) in response to a user request. Embodiments are not so limited, however, and the respective hypervisor management components 322 can be configured to translate a call form FDM 320 from a configuration profile of the cluster controller 324 to a configuration profile of a different third-party hypervisor 304 than that on which the management agent VCI 307 is deployed. For example, hypervisor management agent 307 can be configured to translate a communication from the cluster controller 324 from a configuration of the cluster controller 324 to a configuration profile of third-party hypervisor 304-2.

In some embodiments, a second agent VCI 309 can be deployed on a first-party hypervisor 305. The second agent VCI 309 can be configured to intercept communications from the cluster controller 324 related to configurations of the plurality of VCIs 306. The second agent VCI 309 can gather configuration information regarding the plurality of VCIs 306 from tiling manager (e.g., window manager improved[2], ratpoison, dwm, etc.) interfaces of the plurality of third-party hypervisors 304. Embodiments are not limited to the second agent VCI 309 gathering information from a window manager; however, and the cluster controller 324 and/or management agent VCI 307 can gather configuration information regarding the plurality of VCIs 306 from a tiling manager. In some embodiments, the second agent VCI 309 can be configured to perform at least a portion of the functions that can be performed by FDM 320, hypervisor management components 322, and/or management agent VCIs 307. For example, the second agent VCI 309 can be configured with credentials to access a storage location (e.g., storage location 326) and/or provide high availability to one or more of the management agent VCIs 307 and/or the VCIs 306.

In some embodiments, the respective management agent VCIs 307 can be configured with credentials to log into a corresponding third-party hypervisor 304 and/or management endpoint uniform resource identifier (URI). The respective management agent VCIs 307 can further be configured with credentials to access a storage location 326 supporting the corresponding third-party hypervisor 304. In some embodiments, the cluster controller 324 can be configured with credentials to log into FDM 320. Further, the VCIs 306 can be configured with credentials to access storage location 326. Embodiments are not so limited; however, and, in some embodiments, FDM 320 can be configured with credentials to log into the respective managements agents VCIs 307. In such an example, FDM 320 can be provided with an internet protocol address and/or a domain name associated with the respective management agent VCI 307 that the FDM 320 is configured to log into.

Storage location 326 can store files that can be used by various components in a software defined data center. For example, files used by VCIs 306, third-party hypervisors 304, and/or management agent VCIs 307 can be stored in storage location 326. As an example, files used by VCIs 306 can be stored in storage location 326 to facilitate restarting VCIs 306 on different hypervisors 304, 305 by the FDM 320. In some embodiments, particularly when VCIs 306 are deployed on third-party hypervisors 304, visibility to the storage location 326 from the VCIs 306 and/or management agent VCIs 307 can be obstructed. That is, management agent VCIs 307 may not be able to easily access files stored in the storage location 326 because the third-party hypervisor employs a different configuration profile than the management agent VCI 307. Advantageously, embodiments of the present disclosure can allow for visibility from the VCIs 306 and/or management agent VCIs 307, because the management component 322 can provide translation between the disparate configuration profiles.

The respective management agent VCIs 307 can be configured to store metadata regarding the respective plurality of VCIs 306 deployed on the corresponding third-party hypervisors 304 in the storage location 326. Embodiments are not so limited, however, and the FDM 320 can be configured to store metadata regarding the respective plurality of VCIs 306. The metadata can include information regarding whether or not a VCI 306 is to be restarted. In some embodiments, the cluster controller 324 can be configured to log into a respective management agent VCI 307. Providing access to the storage location 326 can vary based on the hypervisor and/or storage location 326 being used, however, the management agent VCIs 307 can be configured to access the storage location 326 according to the hypervisor and/or storage location 326 being used. For example, the management agent VCIs 307 can be configured to automount a common internet file system share if the hypervisor is a Hyper-V hypervisor.

In some embodiments, the management agent VCIs 307 can elect a master to monitor health of the plurality of third-party hypervisors 304, report the health to the cluster controller 324, and orchestrate a restart of a failed one of the plurality of VCIs 306. For example, management agent VCIs 307-2 through 307-N can elect management agent VCI 307-1 to manage management agent VCIs 307-2 through 307-N. Management agent VCIs 307-2 through 307-N are then slave management agent VCIs 307 with management agent VCI 307-1 as the master. Monitoring the health of the third-party hypervisors 304 can include monitoring a heartbeat, as discussed above in connection with FIG. 2. In some embodiments, orchestrating a restart of a failed one of the plurality of VCIs 306 can include restarting the failed VCI on one of the third-party hypervisors 304 in response to the management agent VCI 307 not receiving a heartbeat.

Figure 4:
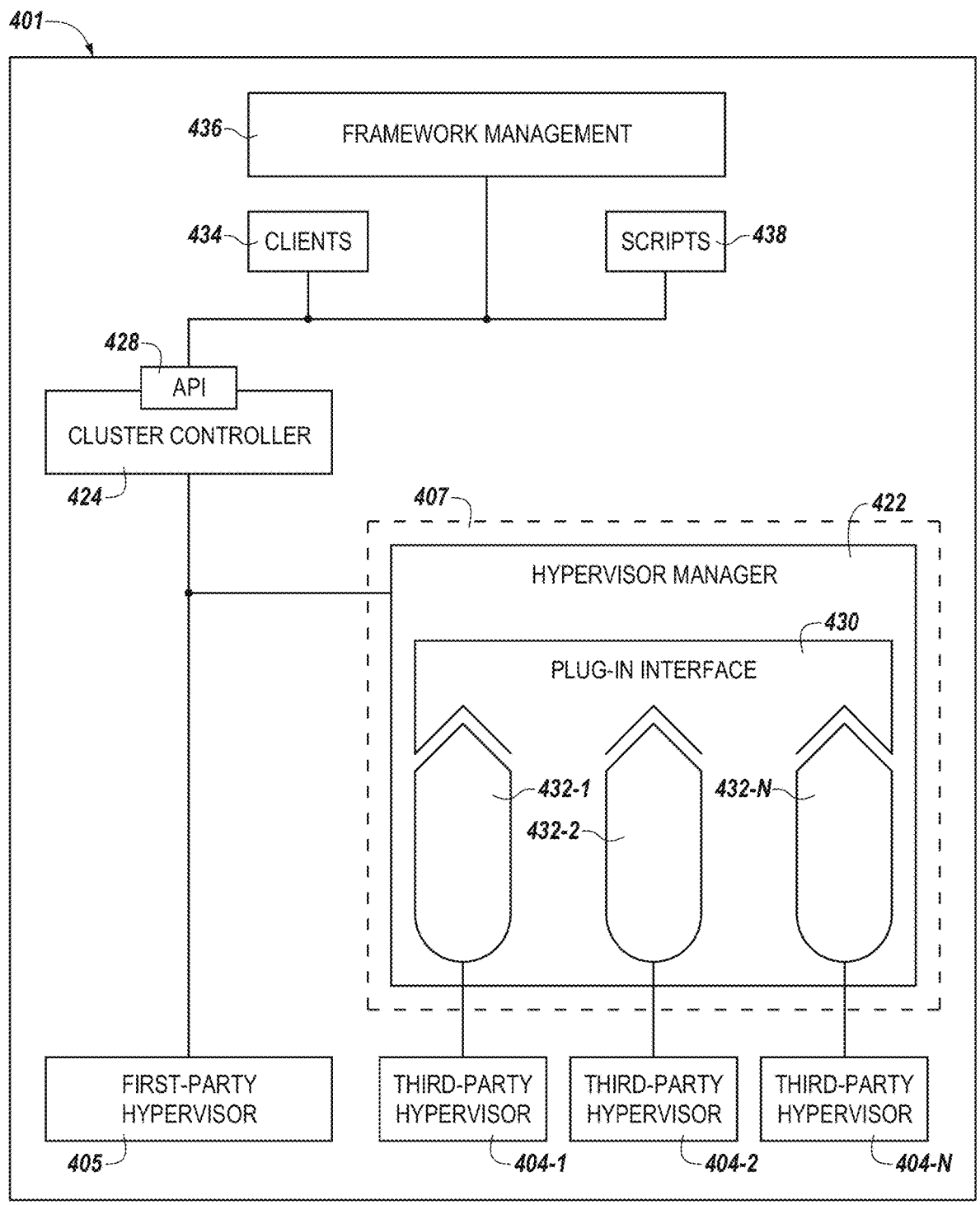
FIG. 4 is a diagram of an architecture for managing VCIs according to a number of embodiments of the present disclosure.

FIG. 4 is a diagram of an architecture for managing VCIs according to a number of embodiments of the present disclosure. In some embodiments, managing VCIs can include protecting VCIs deployed on third-party hypervisors. The architecture 401 can include a first-party hypervisor 405, third-party hypervisors 404-1, 404-2, ..., 404-N, and a hypervisor manager 422. The hypervisor manager 422 can run on management agent VCI 407. The cluster controller 424 can be in communication with the first-party hypervisor 405 and the management agent VCI 407. In some embodiments, the cluster controller 424 can also communicate with clients 434, configuration management frameworks 436, and scripts 438 via API 428, for example. As used herein, "first-party" includes components (e.g., hypervisors and/or VCIs) provided by a same party that provides the cluster controller and/or high availability support, while "third-party" includes components (e.g., hypervisor(s) and/or VCIs) provided by any other party.

Each of the third-party hypervisors 404 can operate according to a respective configuration profile. The respective configuration profiles of the third-party hypervisors 404 can be the same, that is, the third-party hypervisors 404 can each be the same type of hypervisor, or the respective configuration profiles of the third-party hypervisors 404 can different, that is, the third-party hypervisors 404 can each be a different type of hypervisor. Embodiments are not so limited, however, and the third-party hypervisors 404 can operate according to any combination of configuration profiles.

In some embodiments, hypervisor manager 422 can include a plug-in interface 430 that can be configured to associate translation modules 432-1, 432-2, ..., 4320-N with respective third-party hypervisors 404. As an example, the plug-in interface 430 can be configured to associate translation module 432-1 with third-party hypervisor 404-1 in response to a determination that third-party hypervisor 404-1 operates according to configuration profile that can be translated by translation module 432-1. In some embodiments, third-party hypervisor 404-1 can be a Hyper-V hypervisor, and third-party hypervisor 404-2 can be a different third-party hypervisor (e.g., kernel based virtual machine (KVM), Xen®, etc.). In this example, translation module 432-1 can be configured to translate the configuration profile of the third-party hypervisor into a configuration profile that is the same as the configuration profile of the cluster controller 424. Similarly, translation module 432-2 can be configured to translate the configuration profile of the different third-party hypervisor (e.g., third-party hypervisor 404-2) into a configuration profile that is the same as the configuration profile of the cluster controller 424.

Figure 5:
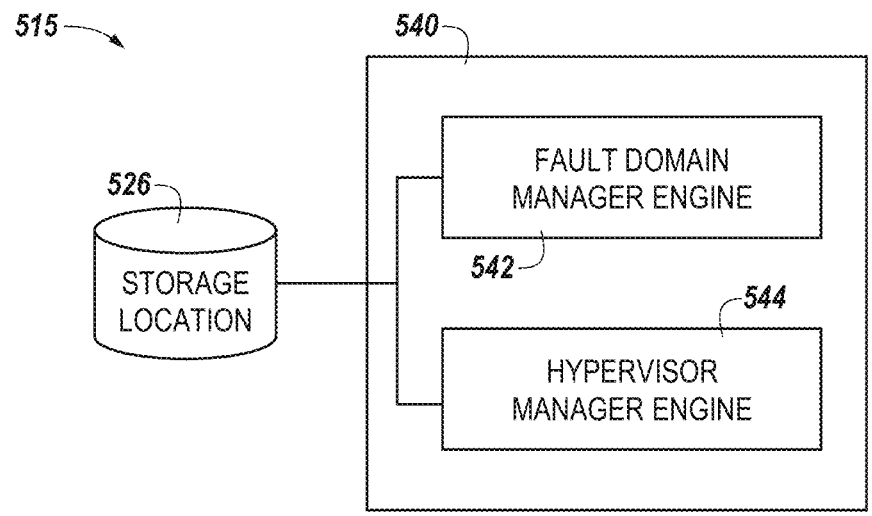
FIG. 5 is a diagram of a computing system for protecting VCIs according to a number of embodiments of the present disclosure.

FIG. 5 is a diagram of a computing system for protecting VCIs according to a number of embodiments of the present disclosure. The system 515 can include a storage location 526 and a subsystem 540. The subsystem 540 can include a number of engines, for example fault domain manager engine 542 and/or hypervisor manager engine 542, and can be in communication with the storage location 526 via a communication link. The system 515 can include additional or fewer engines than illustrated to perform the various functions described herein. The system 515 can represent program instructions and/or hardware of a machine (e.g., machine 617 as referenced in FIG. 6, etc.). As used herein, an "engine" can include program instructions and/or hardware, but at least includes hardware. Hardware is a physical component of a machine that enables it to perform a function. Examples of hardware can include a processing resource, a memory resource, a logic gate, etc. Further, as used herein, "fault domain engine" and "hypervisor manager engine" refer to a portion of a pool of physical computing resources (e.g., computing resources 316 illustrated in FIG. 3) and/or a hypervisor (e.g., hypervisors 306 illustrated in FIG. 3) that are configured to provide the functionality described herein.

The number of engines can include a combination of hardware and program instructions that is configured to perform a number of functions described herein. The program instructions (e.g., software, firmware, etc.) can be stored in a memory resource (e.g., machine-readable medium) as well as hard-wired program (e.g., logic). Hard-wired program instructions (e.g., logic) can be considered as both program instructions and hardware.

In some embodiments, the fault domain manager engine 542 can include a combination of hardware and program instructions that is configured to provide high availability support for VCI(s) (e.g., VCIs 306-1, 306-2, ..., 306-N, 307 illustrated in FIG. 3). In some embodiments, high availability support can be facilitated with information acquired from the storage location 526, which can be external to the subsystem 540.

In some embodiments, the hypervisor manager engine 544 can include a combination of hardware and program instructions that is configured to facilitate interaction between the fault domain engine 542 and a hypervisor (e.g., hypervisors 304 illustrated in FIG. 3) by translating between a first configuration profile and a second configuration profile. However, embodiments are not limited to a particular number of hypervisors or configuration profiles.

Figure 6:
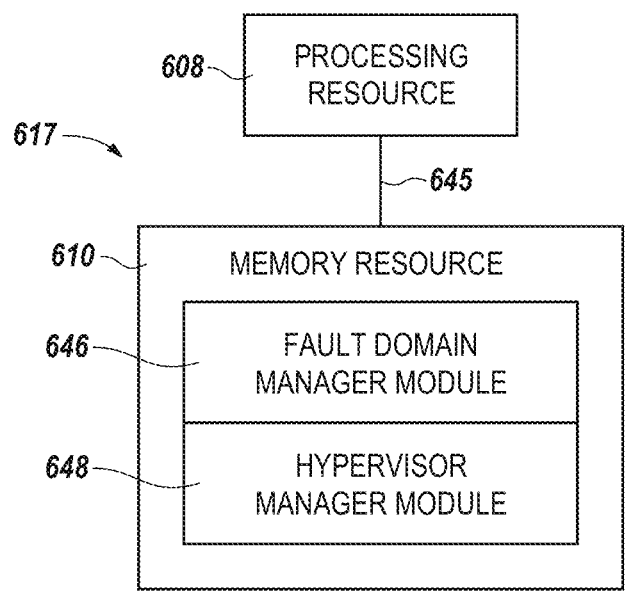
FIG. 6 is a diagram of a machine for protecting VCIs according to a number of embodiments of the present disclosure.

FIG. 6 is a diagram of a machine for protecting VCIs according to a number of embodiments of the present disclosure. The machine 617 can utilize software, hardware, firmware, and/or logic to perform a number of functions. The machine 617 can be a combination of hardware and program instructions configured to perform a number of functions (e.g., actions). The hardware, for example, can include a number of processing resources 608 and a number of memory resources 610, such as a machine-readable medium (MRM) or other memory resources 610. The memory resources 610 can be internal and/or external to the machine 617 (e.g., the machine 617 can include internal memory resources and have access to external memory resources). In some embodiments, the machine 617 can be a VCI. The program instructions (e.g., machine-readable instructions (MRI)) can include instructions stored on the MRM to implement a particular function (e.g., an action such as computing a unit rate of power consumed in a data center). The set of MRI can be executable by one or more of the processing resources 608. The memory resources 610 can be coupled to the machine 617 in a wired and/or wireless manner. For example, the memory resources 610 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

Memory resources 610 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

The processing resources 608 can be coupled to the memory resources 610 via a communication path 645. The communication path 645 can be local or remote to the machine 617. Examples of a local communication path 645 can include an electronic bus internal to a machine, where the memory resources 610 are in communication with the processing resources 608 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 645 can be such that the memory resources 610 are remote from the processing resources 608, such as in a network connection between the memory resources 610 and the processing resources 608. That is, the communication path 645 can be a network connection. Examples of such a network connection can include a local area network (LAN), wide area network (WAN), personal area network (PAN), and the Internet, among others.

As shown in FIG. 6, the MRI stored in the memory resources 610 can be segmented into a number of modules 646, 648 that when executed by the processing resources 308 can perform a number of functions. As used herein a module includes a set of instructions included to perform a particular task or action. The number of modules 646, 648 can be sub-modules of other modules. For example, the fault domain manager module 646 can be a sub-module of the hypervisor manager module 648. Furthermore, the number of modules 646, 648 can comprise individual modules separate and distinct from one another. Examples are not limited to the specific modules 646, 648 illustrated in FIG. 6.

Each of the number of modules 646, 648 can include program instructions and/or a combination of hardware and program instructions that, when executed by a processing resource 608, can function as a corresponding engine as described with respect to FIG. 5. For example, the fault domain manager module 646 can include program instructions and/or a combination of hardware and program instructions that, when executed by a processing resource 608, can function as the fault domain engine 542 and/or the hypervisor manager module 648 can include program instructions and/or a combination of hardware and program instructions that, when executed by a processing resource 608, can function as the hypervisor manager engine 544.

The machine 617 can include fault domain manager module 646, which can include instructions to determine how much power is drawn from each of the power supply inputs to a data center over a time period based on information received from a power distribution unit coupled to the power supply inputs. The hypervisor manager module 648 can include instructions to facilitate interaction between the fault domain manager module 648 and a hypervisor (e.g., hypervisors 304 illustrated in FIG. 3). The hypervisor management module 648 can include instructions to translate between configuration profiles of different hypervisors, for example.

Figure 7:
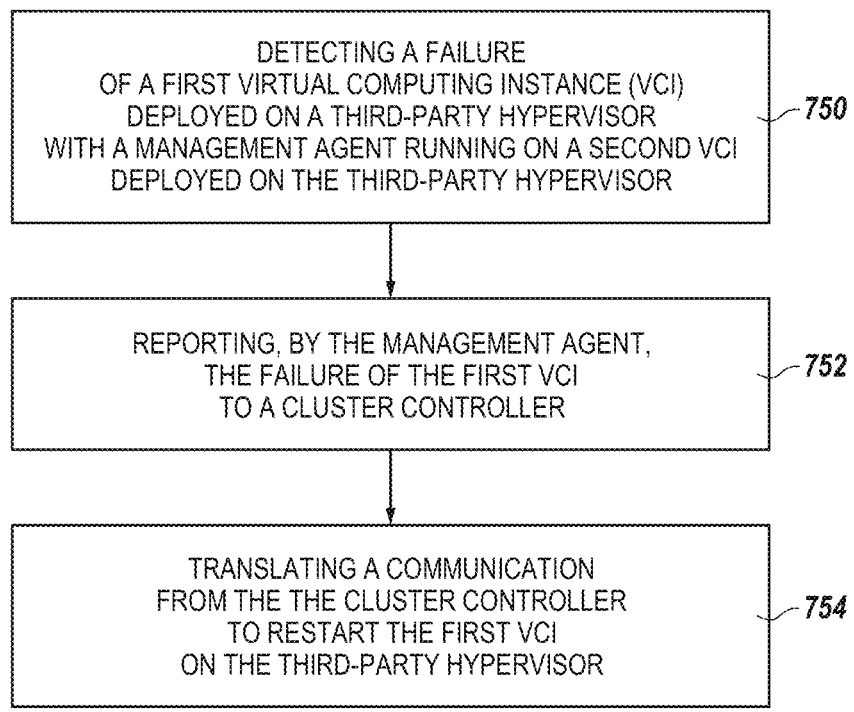
FIG. 7 is a flow chart illustrating a method for protecting VCIs according to a number of embodiments of the present disclosure.

FIG. 7 is a flow chart illustrating a method for protecting VCIs according to a number of embodiments of the present disclosure. At 750 the method can include detecting a failure of a first VCI deployed on a third-party hypervisor and provisioned by a pool of physical computing resources with a management agent running on a second VCI deployed on the third-party hypervisor and provisioned by the pool of computing resources. In some embodiments, detecting a failure of a first VCI deployed on a third-party hypervisor can include detecting that a heartbeat signal corresponding to the first VCI has not been received by the management agent.

At 752, the method can include reporting, by the management agent, the failure of the first VCI to a cluster controller. In some embodiments, the management agent can report to the cluster controller that a heartbeat signal corresponding to the first VCI has not been received.

At 754 the method can include translating, by the management agent, a communication from the cluster controller from a configuration profile of the cluster controller to a configuration profile of the third-party hypervisor to restart the first VCI on the third-party hypervisor. In some embodiments, translating the communication can include using a translation module, as described in connection with FIG. 4. In some embodiments, the method can include creating a service VCI on the third-party hypervisor in response to a cluster controller determining that the VCI is a high availability VCI.

In some embodiments, the method can include accessing, by the management agent, a third-party storage location of the first VCI. The method can include storing, by the management agent, a path to a file in a third-party storage location of the first VCI in response to the first VCI being started on the third-party hypervisor. In some embodiments, the third-party storage location can be a storage location as described in connection with FIG. 3, above.

In some embodiments, the method can include translating, by the management agent, a communication from the cluster controller from a configuration profile of the cluster controller to a configuration profile of the third-party hypervisor to restart a third VCI on the third-party hypervisor. In some embodiments, the third VCI can have been previously deployed on a different third-party hypervisor that can be provisioned by a different pool of physical computing resources. The method can also include accessing, by the management agent, a third-party storage location of the third VCI via a path to a file in the third-party storage location of the third VCI previously stored therein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system, comprising:
    a pool of physical computing resources including at least one processing resource;
    a first virtual computing instance (VCI) deployed on a first third-party hypervisor, the first VCI provisioned by the pool of physical computing resources, wherein the first third-party hypervisor and the first VCI operate according to a first configuration profile including a first set of semantics employed by the first third-party hypervisor to facilitate communication between the first VCI and the first third-party hypervisor;
    a fault domain manager (FDM) running on a second VCI that is deployed on a second third-party hypervisor, the second VCI provisioned by the pool of physical computing resources, wherein the FDM is configured to provide support for the first VCI, and wherein the second third-party hypervisor, the second VCI, and the FDM operate according to a second configuration profile including a second set of semantics employed by the second third-party hypervisor to facilitate communication between the second VCI and the second third-party hypervisor; and
    a hypervisor manager running on a third VCI, wherein the hypervisor manager is configured to:
        translate a third configuration profile to at least one of the first configuration profile or the second configuration profile, the third configuration profile including a third set of semantics employed by a cluster controller to facilitate communication between the cluster controller and at least one of the first third-party hypervisor or the second third-party hypervisor; and
        facilitate interaction between the cluster controller and the second third-party hypervisor by translating the third set of semantics employed by the cluster controller to the second set of semantics employed by the FDM.

2. The system of claim 1, wherein the FDM is configured to protect the first third-party hypervisor against at least one of network isolation of the first third-party hypervisor, failure of the first third-party hypervisor, or loss of access by the first third-party hypervisor to a storage location associated with the first VCI.

3. The system of claim 2, wherein the FDM being configured to provide support for the first VCI and for the first third-party hypervisor includes the FDM being configured to monitor health of the first third-party hypervisor and of the first VCI.

4. The system of claim 3, wherein the FDM is configured to communicate the health of the first third-party hypervisor and of the first VCI to the cluster controller.

5. The system of claim 1, wherein the FDM being configured to provide support for the first VCI includes the FDM being configured to write metadata regarding health of the first VCI to a storage location of the first VCI.

6. A method, comprising:
    detecting a failure of a first virtual computing instance (VCI) deployed on a first third-party hypervisor provisioned by a pool of physical computing resources and executed by a processing resource, with a management agent running on a second VCI deployed on a second third-party hypervisor, wherein the management agent is provisioned by the pool of physical computing resources and executed by the processing resource;
    reporting, by the management agent, the failure of the first VCI to a cluster controller;
    translating, by executing one or more translation instructions provided as part of a plug-in interface of the management agent, a communication from the cluster controller from a second configuration profile of the cluster controller to a first configuration profile of the first third-party hypervisor, the second configuration profile including a second set of semantics employed by the cluster controller to facilitate communication between the cluster controller and the first third-party hypervisor, the first configuration profile including a first set of semantics employed by the first third-party hypervisor to facilitate communication between the first VCI and the first third-party hypervisor; and
    in response to translating the communication, restarting the first VCI on the first third-party hypervisor.

7. The method of claim 6, further including accessing, by the management agent, a third-party storage location of the first VCI.

8. The method of claim 6, further including storing, by the management agent, a path to a file in a third-party storage location of the first VCI in response to the first VCI being started on the first third-party hypervisor.

9. The method of claim 6, further including translating, by the management agent, the communication from the cluster controller from a third configuration profile of the management agent to the first configuration profile of the first third-party hypervisor to restart a third VCI on the first third-party hypervisor; and wherein the third VCI was previously deployed on a different third-party hypervisor and provisioned by a different pool of physical computing resources.

10. The method of claim 9, further including accessing, by the management agent, a third-party storage location of the third VCI via a path to a file in the third-party storage location of the third VCI previously stored therein.

11. The method of claim 6, further including creating a service VCI on the first third-party hypervisor in response to the cluster controller determining that the first VCI is configured to protect itself against failure.

12. A virtual computing cluster, comprising:
   a plurality of pools of physical computing resources including at least one processing resource;
   a plurality of third-party hypervisors;
   a respective plurality of virtual computing instances (VCIs) provisioned by respective pools of physical computing resources, wherein respective VCIs are deployed on each of the plurality of third-party hypervisors;
   a respective management agent VCI provisioned by a pool of physical computing resources and deployed on each of the plurality of third-party hypervisors; and
   a cluster controller in communication with the third-party hypervisors via the respective management agent VCI, wherein the cluster controller is configured to provide support for the plurality of third-party hypervisors via the respective management agent VCIs, wherein
      the respective management agent VCIs each include a respective hypervisor management component that includes a plug-in interface that includes one or more sets of translation instructions, wherein a first respective hypervisor management component is deployed on a first third-party hypervisor of the plurality of third-party hypervisors, and the first respective hypervisor management component is configured to translate, by executing at least one set of translation instructions, a communication from the cluster controller to a second third-party hypervisor of the plurality of third-party hypervisors by translating a first configuration profile associated with the cluster controller to a second configuration profile associated with the second third-party hypervisor, the first configuration profile including a first set of semantics employed by the cluster controller to facilitate communication between the cluster controller and the first respective hypervisor management component, the second configuration profile including a second set of semantics employed by the second third-party hypervisor to facilitate communication between the second third-party hypervisor and one or more VCIs deployed on the second third-party hypervisor.

13. The virtual computing cluster of claim 12, wherein the respective management agent VCIs each include a respective fault domain manager (FDM) configured to implement instructions from the cluster controller for a corresponding one of the plurality of third-party hypervisors.

14. The virtual computing cluster of claim 12, further including a second management agent VCI deployed on a first-party hypervisor, wherein the second management agent VCI is configured to:
   intercept communications from the cluster controller related to configurations of the plurality of VCIs; and
   obtain configuration information corresponding to the plurality of VCIs from a tiling manager associated with the plurality of third-party hypervisors.

15. The virtual computing cluster of claim 12, wherein the respective management agent VCI is configured to autostart in response to a reboot of a corresponding one of the plurality of third-party hypervisors.

16. The virtual computing cluster of claim 12, wherein the respective management agent VCI is configured with credentials to log into a corresponding one of the plurality of third-party hypervisors access a storage location supporting the corresponding one of the plurality of third-party hypervisors.

17. The virtual computing cluster of claim 16, wherein the respective management agent VCI is configured to store metadata regarding the respective plurality of VCIs deployed on the corresponding one of the plurality of third-party hypervisors in the storage location.

18. The virtual computing cluster of claim 12, wherein the cluster controller is configured with credentials to log into the respective management agent VCIs.

19. The virtual computing cluster of claim 12, wherein the respective management agent VCIs elect a master to:
   monitor health of the plurality of third-party hypervisors and the plurality of VCIs;
   report the health to the cluster controller; and
   orchestrate a restart of a failed one of the plurality of VCIs.

* * * * *